April 10, 1934.  R. L. CARR  1,953,953
BODY CONSTRUCTION
Filed June 15, 1929   3 Sheets-Sheet 1

Inventor
R. L. Carr

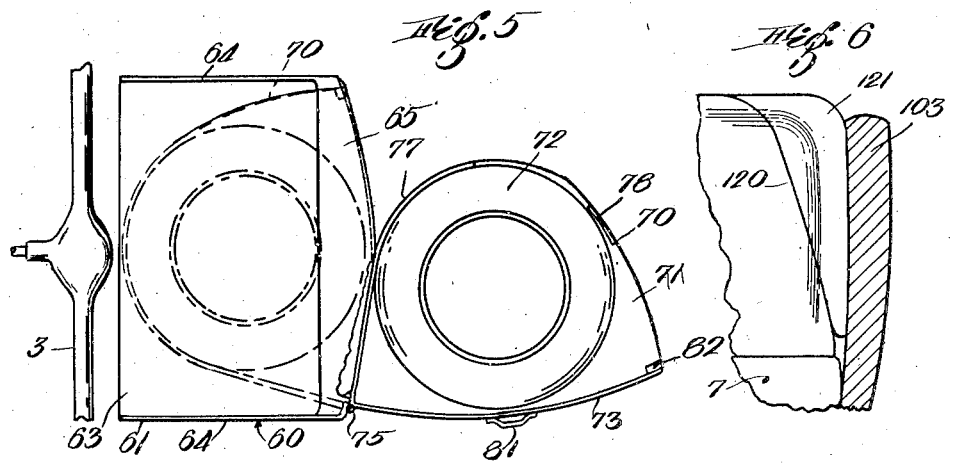

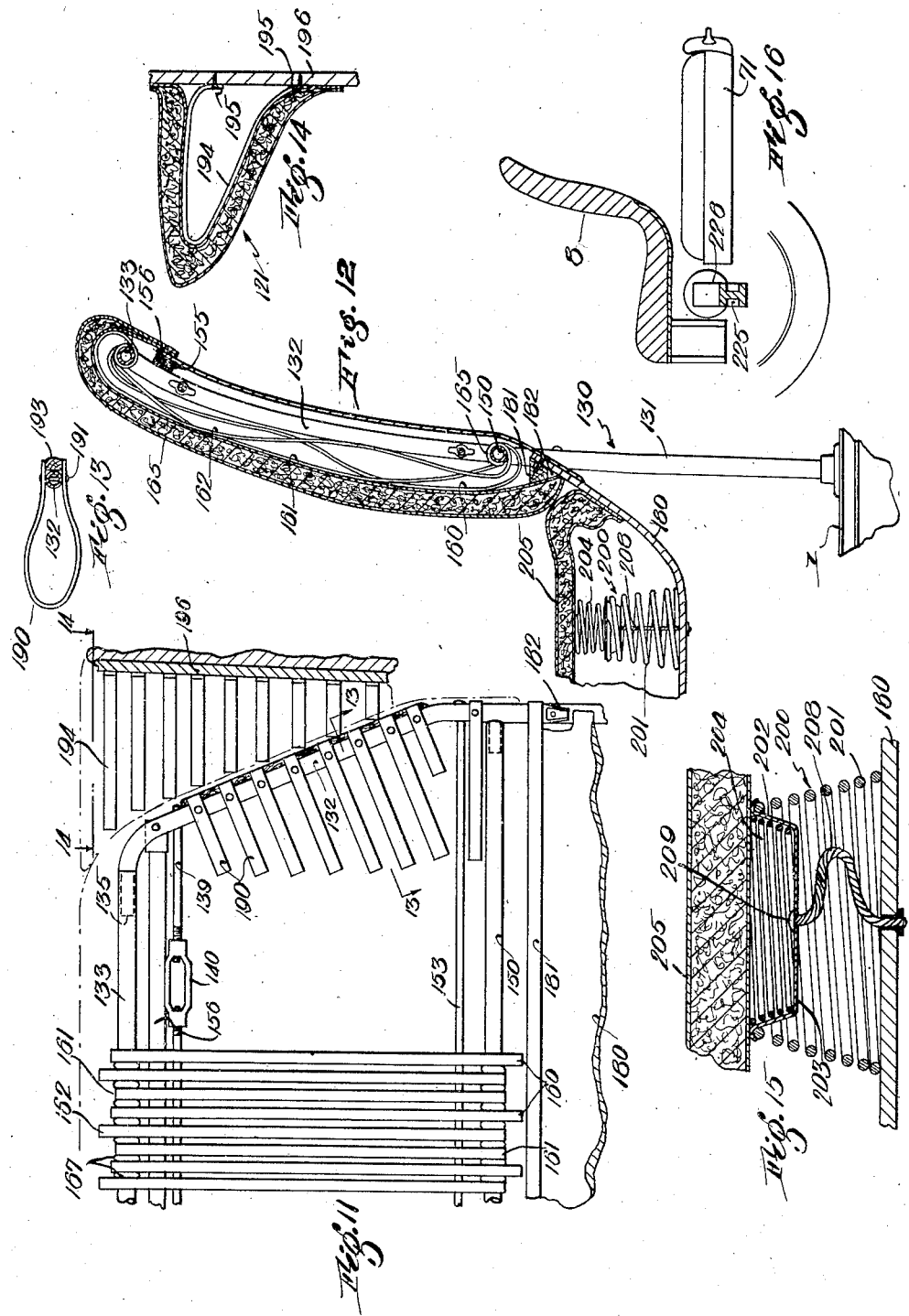

Patented Apr. 10, 1934

1,953,953

UNITED STATES PATENT OFFICE 1,953,953

BODY CONSTRUCTION

Raymond L. Carr, Boston, Mass.

Application June 15, 1929, Serial No. 371,163

5 Claims. (Cl. 296—64)

This invention relates to improvements in vehicles, and more particularly in vehicle bodies with contributory chassis alterations. More particularly, the present invention affords a compact arrangement of the component parts of a vehicle body, such as the seats and storage space, thus permitting the provision of a close-coupled body having a comparatively large rear storage compartment that may be accessible both from the interior of the body and the exterior of the same.

In accordance with this invention, the floor of the rear compartment and the front seat preferably are arranged to provide a suitable space beneath the latter for the reception of the feet and ankles if adults of normal size occupying the rear seat. Accordingly the front and rear seats may be disposed comparatively close to each other without the sacrifice of leg room, which commonly characterizes close-coupled bodies. Due to this arrangement the rear seat may be arranged substantially in front of the rear axle, allowing ample room for the large rear storage compartment. Furthermore, this arrangement permits the provision of adequate space for the storage of the spare tire in a concealed position at the rear of the body where the tire is substantially centrally disposed laterally of the body.

In order to permit the arrangement of the seats in the indicated manner, the rear seat preferably is disposed slightly lower than the front seat so that the feet and lower portions of legs of the occupants of the rear seat may be disposed under the front seat. In order to afford adequate clearance, particularly with the conventional rear wheel drive, the rear seat as well as the front seat preferably is of special construction, the effective thickness of their cushions being somewhat less than has heretofore been employed. It ordinarily is considered desirable to provide comparatively deep cushions for vehicle seats, in order to permit the springs thereof to have an adequate amplitude of movement to give easy riding qualities. In accordance with the present invention, this result is attained, however, without requiring a cushion assembly of the conventional depth by the provision of a spring arrangement which is comparatively sensitive to all minor or ordinary shocks and which becomes comparatively stiff in response to unusually severe shocks. In order to permit the maximum leg room with a compact body assembly, the back of the seat cushion is also preferably of special design, comprising elongate leaf spring elements which are particularly desirable in permitting the vertical movement of the seat occupant in relation to the seat back. A body of this character is particularly adapted for use with a collapsible top of the type disclosed and described in my copending application Serial No. 311,119, filed October 8, 1928, and accordingly the body may be of the open or convertible type. The compact arrangement of the seats is particularly desirable with a top of this type, since it permits the same to be self-contained or self-wrapping without necessitating objectionable projection of the folded top beyond the end of the body.

Since the front and rear seats are spaced close to each other in accordance with this invention, the front of the rear seat is close to the back of the front seat and it is advantageous to provide a single door at each side of the body to afford access to the front and rear compartments, thus simplifying the body construction and avoiding the necessity of providing an intermediate door post with related parts. Furthermore, in the case of a convertible body such, for example, as disclosed in my copending application Serial No. 371,162, filed June 15, 1929, it is somewhat more satisfactory and economical to provide two relatively movable windows upon each side of the vehicle body rather than three, as would be necessary were two doors to be provided and the same visibility to be afforded to the occupants of the rear seat. It has heretofore been conventional with two-seated bodies having a single door upon each side to make the front seats movable or folding. Seats of this character generally are not as comfortable as seats that are built into the body, and the necessity for the movement of the occupants of the front seat has tended to prejudice the motoring public against bodies of this character. Accordingly the present invention affords a special arrangement of the back of the front seat which permits provision of adequate room for entrance to the rear compartment without necessitating movement of the occupants of the front seat, the major portion of this seat preferably remaining fixed or stationary in relation to the body. With seats of this character I prefer to provide an adjustable control arrangement of the general character disclosed in my copending application Serial No. 371,164, filed June 15, 1929, which permits the ready adjustment of the control pedals and/or the steering wheel to suit the requirements of drivers of different heights.

The above and further objects and advantageous features of the present invention will be apparent to those skilled in the art upon a reading of the subjoined description and claims taken in conjunction with the drawings, in which:

Fig. 5 is a somewhat diagrammatic view showing the arrangement of the rear tire containing compartment, the tire holder being shown in full lines in the position which will permit removal of the tire and being shown in dot and dash lines in its normal concealed position within the body;

Fig. 6 is an elevational detail of a portion of the back of the front seat and adjoining parts;

Fig. 7 is a top view of this portion of the front seat, the door being shown swung open in full lines and closed in dot and dash lines;

Fig. 8 is a sectional detail on line 8—8 of Fig. 1;

Fig. 9 is an elevational detail of a portion of the assembly shown in Fig. 8;

Fig. 10 is a transverse broken sectional view of a portion of the rear floor assembly;

Fig. 11 is an elevational view of a portion of the spring assembly for the back of the front seat, parts being removed for clarity of illustration;

Fig. 12 is a vertical sectional view of a portion of the front seat, including the back of the same, parts such as the springs at the end of the seat back being removed;

Figure 1:
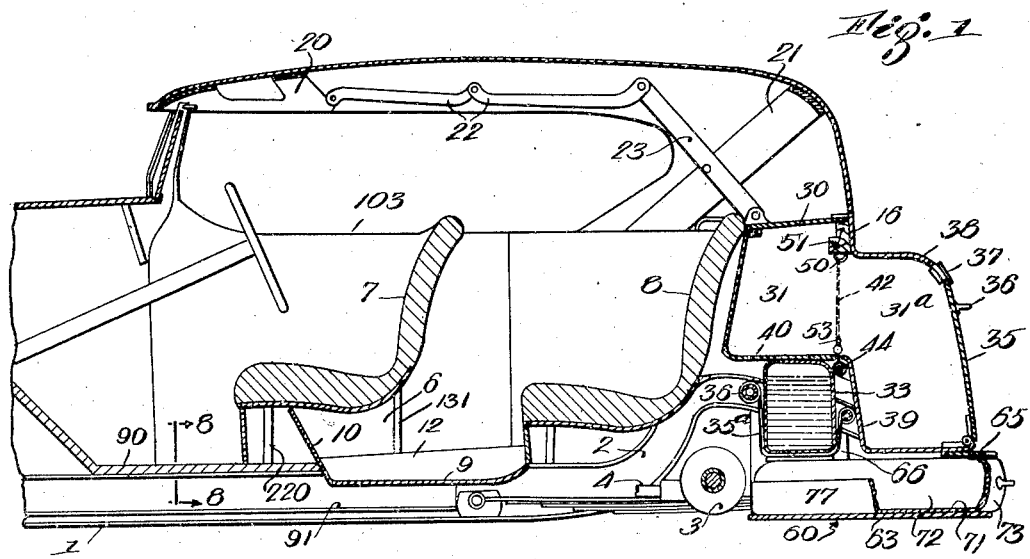
Fig. 1 is a longitudinal sectional view of a vehicle body and a portion of the chassis constructed in accordance with the present invention.

Figs. 13 and 14 are sections on the lines 13—13 and 14—14 respectively of Fig. 11;

Fig. 15 is a transverse sectional view through a portion of the seat cushion when the same is considerably depressed; and Fig. 16 is a sectional view of the rear seat and related parts, showing an optional arrangement of the same when front wheel drive is employed.

In the accompanying drawings, the numeral 1 designates the side member of the chassis frame which may have a considerable "kick-up" 2 over the rear axle 3. The latter preferably may be of the hypoid or worm gear type, thus permitting the drive shaft 4 to be disposed comparatively low in relation to the rear compartment. The body preferably is provided with a front seat 7 and a rear seat 8, the former being shaped to provide a space 6 for the major portion of its extent longitudinally of the vehicle to receive not only the feet but the lower portions of the legs of the occupants of the rear seat. In order to permit the seats to be arranged in this manner and yet to avoid undesirable height of the same, the rear seat 8 preferably is disposed at a slightly lower level than the front seat. The floor 9 of the rear compartment is also preferably disposed somewhat below the top of the chassis frame and may be provided with an inclined foot support 10 at its front end. The space thus providing leg room for the occupants of the rear seat permits the rear seat to be disposed relatively low and the legs to be extended at a small angle to the horizontal. As shown, for example, the front wall of this space or the support 10 may be spaced in front of the rear seat at a distance substantially twice the height of the surface of the seat cushion above the floor 9. In order to afford adequate clearance for the drive shaft 4, the floor 9 may include an intermediate housing 12 extending upwardly somewhat above the body portion of the floor, Figs. 1 and 10.

To permit the maximum compactness of the chassis as well as of the body that is compatible with adequate room and a suitable low center of gravity, the rear seat also is preferably of the same general design as the front seat; thus a suitable clearance space is provided below the same for the axle and/or the rear portion of the drive shaft. The back of the body itself, designated by the numeral 16, preferably is disposed at a considerable distance behind the back of the rear seat. This arrangement provides adequate room for the use of a foldable top of the general character disclosed and described in my copending application Serial No. 311,119, which comprises a front shell 20, a rear shell 21, intermediate links 22, and main support arms 23 to which the rear shell 21 is pivoted. When the top is folded, the front shell 20 is disposed above the intermediate linkage and cooperates with the rear shell 21 in substantially enclosing the remainder of the top, thus forming a self-contained unit which is substantially self-wrapping and does not require the application of a special protective boot or dust cover.

A suitable swinging closure or door 30 preferably is disposed between the front seat and the rear of the body and affords access to a storage space 31 which is disposed behind the back of the rear seat. Preferably the fuel tank 33 may be disposed beneath this space, being supported by suitable straps 35ª depending from cross members 36 of the chassis frame. A suitable trunk-like compartment 38 preferably is disposed at the rear of the body proper and may be finished to resemble a separate trunk, if desired. Preferably this compartment provides a storage space 31ª which normally may form a continuation of the space 31. Access to this compartment may be provided in any suitable manner, as by the downwardly swinging door 35 which is provided with a handle 36 and a lock 37. Preferably the bottom of the compartment 38 is disposed substantially at the level of the top of the main portion of the chassis frame and a substantially vertically disposed front wall 39 of this compartment extends upwardly to a horizontal surface 40 disposed above the fuel tank and below the storage space 31.

In order to permit these storage spaces to be arranged to meet a variety of requirements and the needs of different users, I preferably provide a collapsible partition 42 which may be disposed between spaces 31 and 31ª so that they may be separated, if desired, or which may be retracted so that but one large storage space is provided. For this purpose the member 42 may be a comparatively heavy fabric mounted upon a spring roller 44 of the conventional curtain roller type, which is disposed adjoining the junctures of walls 39 and 40; accordingly the door 30 or the door 35 may afford access to the curtain. A suitable fastening element 50 may be provided upon a frame member 51 at the back of the body to engage a hook 53 or the like upon the curtain in order to hold the same in its extended position. If desired, suitable fastening means may be arranged at each side of the compartment 38 to permit the optional extension of the curtain to the door 35 to divide the storage space horizontally. It is evident that when the collapsible wall or curtain 42 is raised a compartment is provided which is accessible through the door 30 and that a second compartment is provided which is accessible through the door 35. However, if for any reason it should be desired to gain access to both compartments from the rear of the vehicle or the interior of the same, this may readily be done by lowering the member 42.

Figure 2:
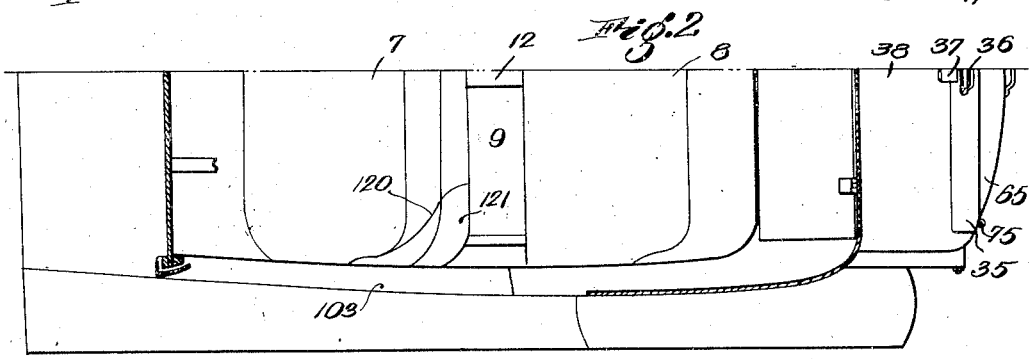
Fig. 2 is a top view of a portion of the body, parts being shown in section.
Figure 3:
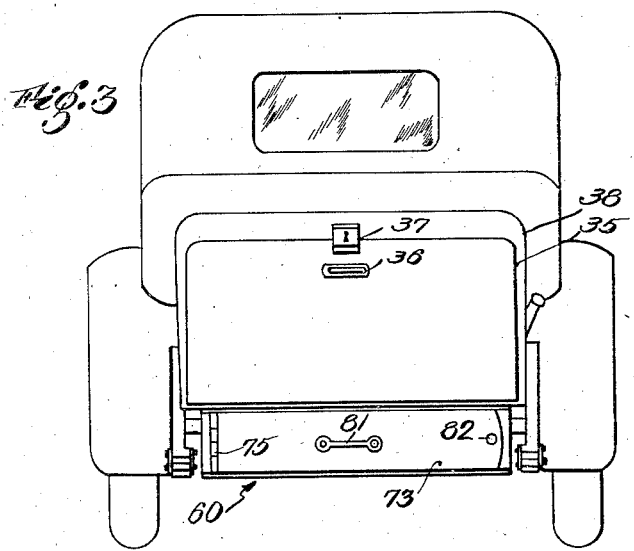
Fig. 3 is a rear elevational view of the vehicle.
Figure 4:
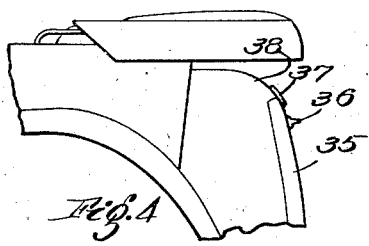
Fig. 4 is an elevational view of a portion of the rear of the body with the top in its folded position.

Preferably the storage space and gasoline tank are so arranged that room is provided beneath the same for a tire container, designated in general by the numeral 60. For this purpose a fixed box-like assembly 61 is provided, having bottom and side walls 63 and 64 respectively and being provided with an upper wall 65 adjoining its rear end. If desired, the intermediate portion of this container may extend somewhat to the rear of the door 35, as shown in Figs. 1 and 2. Preferably metal straps or brackets 66 are provided to support the front portion of the container assembly 61, while the upper wall 65 thereof may be secured to the floor of the storage compartment. In order to provide the maximum convenience to the user of the vehicle, a tire holder or receptacle 70 preferably is arranged to move into and out of container 61. The arrangement of this holder is shown more particularly in Figs. 1, 3 and 5. It comprises a bottom portion 71 upon which the side of the tire 72 may rest. This receptacle has an outer wall 73 which forms a closure for an opening at the rear of compartment 61 and which is supported by a hinge 75 that is disposed at one side of that opening (Fig. 3). An upright flange 77 extends inwardly from the closure wall 73 and has a curved front end which is adapted to engage a peripheral portion of the tire to prevent horizontal movement of the same, while a shallow flange 78 may be disposed at the opposite side of the member 70 for this purpose. The tire container may be provided with a suitable handle 81 and a lock 82.

In Fig. 5 the tire holder 71 is shown in the position which it may occupy when a tire is to be removed from the same, while the dotted line position of the holder is that which it normally occupies, it being evident that it is swung about the hinge 75 from one to the other of these positions. This arrangement permits the tire to be readily removed from the holder or to be placed thereon without unnecessary lifting and it to be carried in a concealed position where it is protected against the elements and against theft. Furthermore, the tire may be disposed in a substantially central position laterally of the vehicle so that the balance of the same is not affected.

In order to permit the seats to be arranged at the minimum height compatible with comfort, the floor boards 90 of the front compartment may be arranged with their upper surfaces substantially on a level with the upper surface of the frame channel 1. Fig. 8 shows the preferred arrangement of these parts. A channeled subframe 91 preferably is secured to the inner face of the frame channel 1 reinforcing the latter and having a flange 92 spaced below the upper flange of the main frame member to provide a ledge supporting the floor board 90. Any suitable mat 95 may be disposed upon the floor board 90 and the upper flange of the frame member 1 so that these parts cooperate in forming the floor of the front compartment.

The threshold assembly for the door may comprise a scuff plate 96 which is secured to a ranger 97 that is mounted upon brackets 98 secured to the outer side of frame member 1. Suitable recesses 100 may be formed in the lower part of the ranger to receive these brackets.

Since a single door 103 preferably is disposed upon each side of the vehicle body, the scuff plate 96 extends back to the rear compartment. Fig. 10 shows the arrangement of the threshold assembly and the floor of this compartment. In this portion of the body the scuff plate 96 has an extension 97 resting upon the upper flange of the frame member and having a dependent continuation 98 which is inclined inwardly. The subframe channel 91 provides a ledge 92 which is secured to a flange 105 of the rear floor member 9. The latter extends downwardly from the flange 105 so that the body portion of the floor member is disposed below the upper flange of the frame channel. The intermediate portion of the member 9 forms an upwardly extending housing 12 with parallel walls 113, which are connected by a semi-circular upper portion 114, thus providing a housing for the drive shaft intermediate the sides of the rear compartment. This housing preferably is joined to the inclined foot support 10 that is an integral extension of the member 9.

In order to permit ready access to the rear compartment without necessity for providing a folding or movable front seat, the end of the front seat back is cut away, as designated by numeral 120, and the auxiliary back portion 121 carried by the door is adapted to engage this portion of the seat back when the door is closed. As shown particularly in Fig. 6, the seat back is of substantially full width adjoining the lower part of the seat and the auxiliary back portion 121 tapers upwardly to have its maximum transverse dimension adjoining the upper part of the seat. Furthermore, as designated by numeral 123 in Fig. 7, the rear portion of the auxiliary back 121 extends behind the adjoining portion of the main seat back. Since the back of the front seat is inclined, the region of minimum width afforded for entrance to the rear compartment ordinarily is in the vicinity of the top of the body wall. With the auxiliary back portion 121 carried by the door when the latter is swung open, as shown in full lines in Fig. 7, a space of considerable width will be provided between the corner of the body wall and the closest portion of the front seat, this distance being designated by the symbol A. Since the seat back inclines downwardly and forwardly, it is not necessary to provide the auxiliary back portion 121 with the same cross-sectional dimensions adjoining the lower part of the seat in order to provide a space of uniform width for access to the rear seat. It is evident that when a person is sitting in the front seat adjoining the auxiliary back 121 and the door is opened that the support for the lower portion of this person's back will not be removed and that little, of any, movement will be required of the occupant of the front seat in order to permit the ready movement of a person into or from the rear compartment. Obviously this arrangement may be employed advantageously whether the door swings rearwardly, as shown, or swings forwardly.

Figs. 11 and 12 show in detail the arrangement of the framing for the front seat, with certain parts omitted for clarity of illustration; it being understood that the framing for the back seat may preferably be of substantially the same design, if desired. For this purpose a frame assembly 130, which may be formed of steel tubing, has lower portions 131 secured to the chassis frame 1 and has a substantially U-shaped body portion defining the shape of the seat back, this U-shaped portion including the inclined side pieces 132 and the upper transverse member 133. To permit convenient assembly of this frame, the side members 132 are provided with substantially horizontal extensions 135, which are adapted telescopically to engage the ends of the hollow transverse member 133. A tie bar 139 may connect the opposite side members 132 of the frame, being provided with a turnbuckle 140 or the equivalent to permit the ready tightening of the side members into engagement with the upper transverse member. A lower transverse member 150 similar to the member 133 may be provided, suitable horizontal extensions 151 of the side members of the frame being telescopically engageable with this member and a tie rod 153 being provided adjoining this portion of the frame, which in general corresponds to rod 139.

The back of the seat preferably is provided with a novel type of spring arrangement comprising elongate flat metal or leaf members which may be provided with a plurality of different shapes. Thus, for example, there may be three sets of springs properly interspersed and each arranged primarily to render support to one of three different portions of the seat back. Thus springs 160 may have a curvature enabling them to support the lower portion of the seat back and may be bowed out of engagement with the upper portion thereof. At one side of each spring 160 there may be another spring 161 which is bowed outwardly primarily to provide a support for the intermediate portion of the back, and at the other side of each spring 160 another spring 162 may be provided with an outwardly bowed upper portion to support the upper part of the seat back. It is evident that the padding 165 for the seat back is drawn over these springs so that its lower portion normally engages a plurality of the springs 160, its intermediate portion engages a plurality of the springs 161, and its upper portion engages a plurality of the springs 162. These springs are so arranged in relation to each other that one of the three sets of springs will support each section of the seat back and so that another set of springs is disposed somewhat behind this portion of the seat back so that should unusual load be imposed thereon, two sets of springs may then support that section. These springs may each be provided with cylindrical end portions 165 which are rotatable upon the parallel members 133 and 150. Suitable spacers 167 may be disposed between these cylindrical portions of the springs, if desired.

It is evident that this arrangement provides a seat back which may be readily yieldable to afford easy riding conditions while not requiring the depth which is necessary with the conventional coil springs. Accordingly the room within the body is conserved and the same may be more compact. As shown, the upper portion of the rear part of the seat back may be curved backwardly so that the same is somewhat concave, as viewed in Fig. 12, to afford additional room for the knees of occupants of the rear compartment. A spring arrangement of this character is particularly satisfactory, since it does not tend to oppose vertical movement of the seat occupants as do the conventional coil springs. The bulging portions of the leaf springs 160, 161, and 162 afford relatively little opposition to vertical movement of the seat's occupants in response to a severe shock, the forwardly bulged portions of the springs readily moving upwardly and downwardly with a wave-like motion.

For convenience of illustration, I have shown the curved leaf springs 160, 161 and 162 as applied to a portion only of the seat back, but ordinarily they will bridge the space between the members 133 and 150 for the full width of the former. At the inclined ends of the main seat back, springs similar to those employed in the remainder of the back may be provided, having, however, relatively shorter lengths, but I prefer to employ the arrangement illustrated in Figs. 11 and 13 wherein a plurality of bowed or looped springs 190 with their end portions are secured by rivets 191 to the inclined portions 132 of the frame 130. Preferably these end portions may extend slightly beyond the frame to engage and support a nailing strip 193. Suitable metal clips 155 may be secured to the rear of the members 132 adjoining their upper ends and may support a transverse nailing strip 156; the covering for the seat may be secured in the conventional manner to the strips 156 and 193.

Springs for the auxiliary seat back 121 may be of a construction similar to that employed at the end of the main back, comprising bowed elements 194 having end portions 195 in engagement with a panel 196 carried by the door, as shown in Fig. 14.

The bottom of the seat may include a sheet member 180 which provides a support for the cushion assembly and is formed of any desired material, such as a suitable synthetic composition or plywood. The rear portion of this member is inclined downwardly and forwardly to afford the maximum leg room in the rear compartment adjoining the lower rear corner of the front seat. The upper edge of the panel 180 preferably is secured to a transverse support 181, the ends of which are mounted upon brackets 182 that are carried by the upright portions of the seat frame 130, while the front of member 180 is supported on legs 220 (Fig. 1).

In order to permit the seat cushion assembly to have a comparatively shallow depth and yet to provide riding qualities that may be comparable to or superior to those of the deepest seat cushions, a special spring arrangement is provided which comprises a plurality of spring assemblies 200. One of these assemblies is shown in its expanded position in Fig. 12 and in a considerably compressed position in Fig. 15, and preferably comprises a relatively heavy coil spring 201 which may be substantially frustoconical, and the upper portion of which supports a sheet metal cup 202. The latter has a bottom 203 disposed below the upper portion of spring 201 and supporting a lighter, more sensitive coil spring 204 which engages the padding 205 of the seat in the conventional manner. Preferably a flexible cable 208 passes through an opening in the bottom 203 of cup member 202 and carries an abutment member 209 that is adapted to engage the upper surface of plate 203. The lower end of the cable 208 is secured to the panel 180. When the spring assembly is in its normal expanded position the cable 208 will be held taut and may maintain spring 201 under a slight compression.

Spring 204 is comparatively light and accordingly readily permits the movement of padding 205 in response to loads or shocks of moderate intensity. If the spring 201 is held under slight compression by the cable 208, light loads will not cause appreciable compression of the heavier spring, while a load of slightly greater intensity, for example such as is encountered during moderate shocks, will cause the combined movement of springs 204 and 201, thus affording a comparatively high sensitivity throughout a wide intermediate range. When the shock or load is great enough to cause spring 204 to be depressed so that its upper portion is substantially on a level with the upper edge of cup 201, spring 204 will be held compressed and the entire additional load will then be imparted to the heavier spring 201 which affords a comparatively strong resistance to further movement. When the load is released, the cable 208 acts as a rebound check to prevent the movement of the spring 201 upwardly beyond its normal position, thus affording a rebound check for moderate and heavy shocks. The light spring 204 is sufficiently soft acting or sensitive so that continued upward movement of the load will not cause the same to pass appreciably beyond its normal position upon rebound.

It is thus evident that I have provided a spring arrangement for the seat cushion which is adapted to afford ideal riding qualities without necessitating the depth of cushion heretofore employed. Due to the provision of the cup 202 the total length of the springs supporting the padding 205 is greater than the distance between this padding and the panel 180 and when the springs are but lightly compressed, for example merely under the load of the seat occupant, the entire cushioning effect may be obtained from the upper spring 204 due to the maintenance of the spring 201 in its compressed condition. Thus satisfactory cushioning may be readily attained without objectionable softness, which is undesirable, particularly in hot weather. When the vehicle is subjected to shocks of moderate intensity, however, the spring 201 as well as the spring 204 is compressed so that a maximum sensitivity is provided throughout an intermediate range, which may be as great or greater than that afforded by cushions having springs which are commonly considered too soft for all riding conditions. In response to shocks of unusual severity which are rarely encountered, the springs are brought to the position illustrated in Fig. 15 where the heavy supporting spring 202 receives the entire additional load and accordingly provides a stiff resistance for the same.

It is evident that this general arrangement may be closely followed in the construction of the rear seat to permit the same to afford the maximum compactness for the vehicle. In the case of the rear seat the bowed end springs 190 may be omitted, and the rear of the base panel may be mounted directly on the frame portion 2.

When a front wheel drive is employed, a rear seat of this type may be advantageously employed, as shown in Fig. 16, being located above a depressed intermediate portion 225 of a dead rear axle 226 which may be disposed under the intermediate part of the seat. With this arrangement a tire carrier or holder 71 may extend under the rear portion of the seat cushion, as shown, thereby permitting a very compact arrangement.

It is evident that the present invention permits the provision of a two-seated, close-coupled body which may afford adequate leg room and a comparatively large storage space upon a vehicle of moderate wheel base. The arrangement of the upholstery is particularly important to this end in providing easy riding qualities and yet adequate room for the feet and lower portions of the legs of the occupants of the rear seat under the front seat as well as permitting suitable clearance adjoining the rear axle. With an arrangement of this character it is highly desirable to provide a front seat that is stationary, and accordingly the provision of a single door carrying an auxiliary seat back portion in order to afford ready access to both of the closely spaced seats is desirable.

I claim:

1. In a vehicle body, a front seat, a back seat, a floor disposed in front of the back seat and extending under the front seat to cooperate therewith in providing a space sufficiently large to receive the feet and ankles of occupants of the rear seat, the front portion of the back seat being disposed adjoining the back portion of the front seat, whereby a close coupled body is provided, a single door affording access to both of said seats, said door carrying an auxiliary back portion engageable with the end of the back of the front seat when the door is closed and movable with the door to provide a space of considerable width for access to the rear seat when the door is open.

2. A vehicle body comprising a chassis frame, a rear seat, a front seat, a rear floor and a front floor before said rear and front seats respectively, the rear seat and rear floor being disposed below the front seat and front floor respectively, the chassis frame having substantially horizontal side rail portions adjoining the sides of said floors, said rear floor being disposed below the tops of said side rail portions, the rear floor cooperating with the front seat to provide a space under the front seat to receive the feet and lower parts of the legs of occupants of the rear seat, an upwardly extending wall at the front of said space, said well being disposed in front of the rear seat at a distance at least of the order of substantially twice the height of the rear seat above the rear floor, whereby a close coupled body is provided with a low rear seat and leg room for the occupants of that seat permitting the lower parts of the legs to be extended at a small angle to the floor.

3. A vehicle body comprising body walls, a front seat and a back seat between said walls, a relatively wide swing door in one of said walls affording access to both of said seats, said front seat including a back cushion portion and a bottom cushion portion, the latter having its ends juxtaposed to said walls, said back cushion portion having a main body part in normally fixed relation to the bottom portion, and an auxiliary cushion carried by said door, said auxiliary cushion being juxtaposed to the main body part of the seat back when the door is closed to cooperate therewith in providing a seat back and moving away from said part to afford easy access to the rear seat when the door is open.

4. A vehicle body comprising body walls, a front seat and a back seat between said walls, a relatively wide swinging door in one of said walls affording access to both of said seats, said front seat including a back cushion portion and a bottom cushion portion, the latter having its ends juxtaposed to said walls, said back cushion portion having a main body part in normally fixed relation to the bottom portion, and an auxiliary cushion carried by said door, said auxiliary cushion being juxtaposed to the main body part of the seat back when the door is closed to cooperate therewith in providing a seat back and moving away from said part to afford easy access to the rear seat when the door is open, the lower part of the body portion of the seat back being juxtaposed to the body walls and its edges inclining upwardly and inwardly therefrom, the auxiliary cushion having a greater width adjoining the upper part of the body wall.

5. A vehicle body comprising body walls, a front seat and a back seat between said walls, a relatively wide swinging door in one of said walls affording access to both of said seats, said front seat including a back cushion portion and a bottom cushion portion, the latter having its ends juxtaposed to said walls, said back cushion portion having a main body part in normally fixed relation to the bottom portion, and an auxiliary cushion carried by said door, said auxiliary cushion being juxtaposed to the main body part of the seat back when the door is closed to cooperate therewith in providing a seat back and moving away from said part to afford easy access to the rear seat when the door is open, the body portion of the seat back and the auxiliary cushion having substantially contacting surfaces, said surfaces having a general inclination upwardly and inwardly, and rearwardly and inwardly.

R. L. CARR.